United States Patent
Um et al.

(10) Patent No.: US 6,785,034 B2
(45) Date of Patent: Aug. 31, 2004

(54) OPTICAL MODULATOR AND IMAGE PROJECTION DISPLAY APPARATUS USING IT

(75) Inventors: Kee Tae Um, Gunpo (KR); Han Bae Lee, Seongnam (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/227,486

(22) Filed: Aug. 26, 2002

(65) Prior Publication Data

US 2003/0039018 A1 Feb. 27, 2003

(30) Foreign Application Priority Data

Aug. 27, 2001 (KR) ......................................... 2001-51847

(51) Int. Cl.[7] ............................ G02B 26/00; G02F 1/00
(52) U.S. Cl. ...................................... 359/237; 359/246
(58) Field of Search ................................ 359/237, 254, 359/301, 303, 263, 277, 283; 385/4, 10, 12, 37, 40, 130, 903

(56) References Cited

U.S. PATENT DOCUMENTS

| | | | | |
|---|---|---|---|---|
| 5,339,118 A | * | 8/1994 | Tagami | ......................... 348/744 |
| 6,141,465 A | * | 10/2000 | Bischel et al. | .................. 385/4 |
| 6,262,851 B1 | * | 7/2001 | Marshall | ...................... 359/634 |
| 6,337,873 B1 | * | 1/2002 | Goering et al. | ................ 372/69 |
| 6,545,672 B1 | * | 4/2003 | Goyins | ......................... 345/204 |

* cited by examiner

*Primary Examiner*—Ricky Mack
*Assistant Examiner*—Brandi Thomas
(74) *Attorney, Agent, or Firm*—Birch, Stewart, Kolasch & Birch, LLP

(57) ABSTRACT

An optical modulator and an image projection display apparatus using it can reduce a size of a system and improve efficiency, by attaching a reflection plane on a nonlinear matter. The optical modulator in accordance with the present invention includes a nonlinear matter which is divided into predetermined regions having a direction of a polarization which is periodically reversed, an electrode which is joined with the upper and lower sides of the nonlinear matter, for applying an electric field to the polarization region at the lower portion of the nonlinear matter and a reflection plane which is joined to the rear surface of the nonlinear matter, for reflect an incident light to an incident region again. The image projection display apparatus using a reflective optical modulator in accordance with the present invention includes a light source for irradiating a light, a breaker plane which is positioned in the upper portion of the light source, for reflecting the light of the light source to an one-dimensional optical modulator and intercepting the light which is not diffracted in the one-dimensional optical modulator, a collimating lens for focusing the light which is diffracted in the one-dimensional optical modulator, a focusing lens for focusing the light of the collimating lens and a Galvano meter for irradiating an image plane by reflecting the light which is irradiated through the focusing lens.

15 Claims, 10 Drawing Sheets

OPTICAL MODULATOR AND IMAGE PROJECTION DISPLAY APPARATUS USING IT

BACKGROUND OF THE INVENTION

1. Field of the Invention

The present invention relates to an optical modulator and an image projection display apparatus using it and particularly, to an image projection display apparatus using it, capable of reducing a size of a system and improving efficiency, by manufacturing a reflective optical modulator.

2. Description of the Background Art

Conventionally, an one-dimensional optical modulator modulates an incident light by diffracting the light and as a typical one-dimensional optical modulator, there is a Grating Light Valve (GLV) of the Silicon Light Machine (SLM) Co in the US.

The GLV is reflective and has excellent speed and contrast characteristics. Accordingly the GLV is spotlighted as a modulator for displaying for the next generation, but it can not be applied to products of common use.

The structure of the GVL and operational characteristics will be described in detail with reference to FIGS. 1, 2A and 2B.

Figure 1:
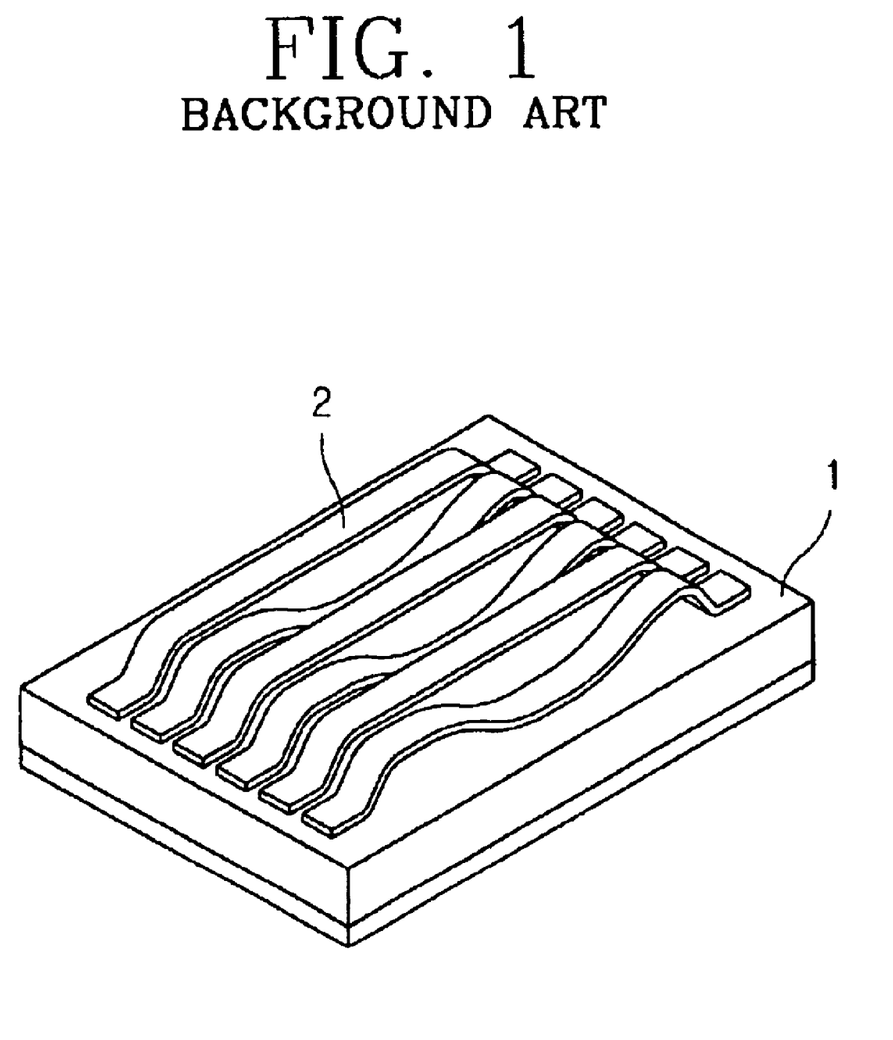
FIG. 1 is a perspective view showing a GLV in accordance with the conventional art.
Figure 2A:
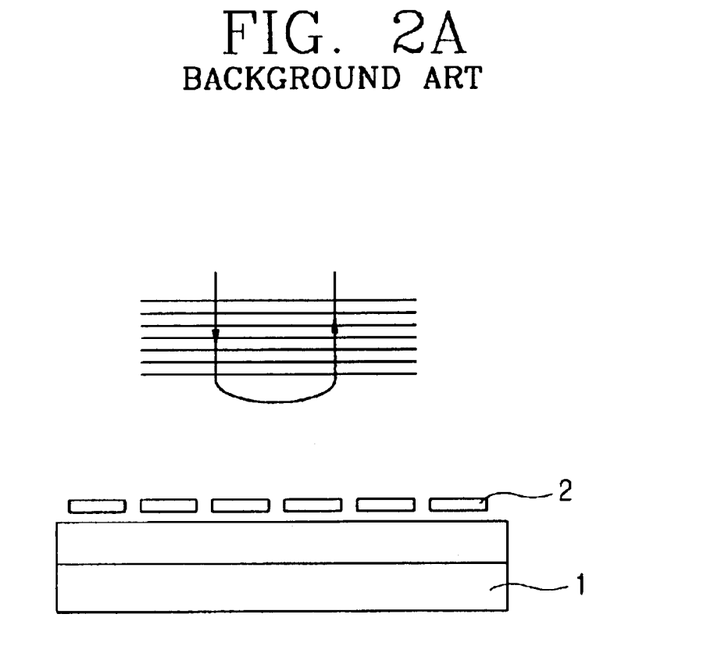
FIG. 2A is a pattern diagram showing a case that a voltage is not applied to the GLV in accordance with the conventional art.
Figure 2B:
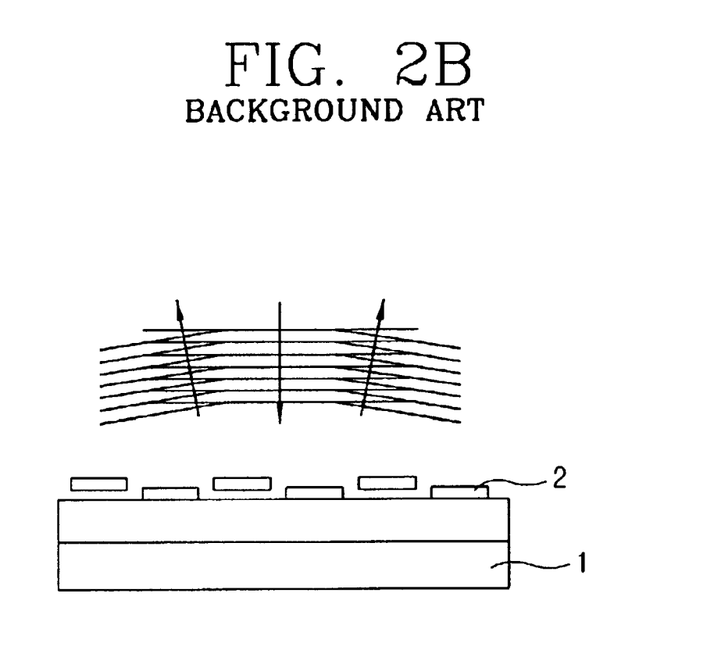
FIG. 2B is a pattern diagram showing a case that a voltage is applied to the GLV in accordance with the conventional art.

FIG. 1 is a perspective view showing a GLV in accordance with the conventional art, FIG. 2A is a pattern diagram illustrating a case that a voltage is not applied to the GLV in accordance with the conventional art, and FIG. 2B is a pattern diagram illustrating a case that a voltage is applied to the GLV in accordance with the conventional art.

As shown in FIG. 1, the GLV includes a substrate 1 which is composed of a silicon chip, and a plurality of ribbons 2 which are installed on the substrate 1, for reflecting a light.

The both sides of the respective ribbons 2 are fixed to the substrate 1, and the center portion (upper surface) is designed to be a predetermined distance apart from the substrate 1. Also, the plurality of ribbons 2 are connected with a means to which a voltage is alternately applied.

The ribbons of the GVL are under a same condition in case a voltage is not applied and when a voltage is applied to the GLV, the means to which the voltage is applied and the connected ribbons 2 are bent to the substrate 1 side, form a grating corresponding to the incident light from the outside, and modulate the light by using diffraction by the grating.

That is, as shown in FIG. 2A, if a voltage is not applied to the ribbons 2, the ribbons 2 are positioned on a same plane. At this time, when a light is made incident vertically in parallel, the ribbons 2 function as a mirror surface, thus to directly reflect the light.

As shown in FIG. 2B, when a voltage is alternatively applied to the plurality of ribbons 2, the ribbons 2 to which the voltage is applied is bent to the substrate 1 side and the upper surface of the ribbons 2 is formed in a latticed structure, thus to diffract a light which is irradiated vertically. As the incident light is diffracted by the ribbon-latticed structure, the incident light is modulated.

The GLV which is an one-dimensional optical modulator controls a distance along the incident wave length that the ribbon 2 descends. At this time, to obtain an optimal efficiency, the distance that the ribbon 2 descends must be ¼ of the wave length ($\lambda$) of the incident light.

However, the operation of the GLV is a mechanical operation according to application of a voltage and there occurred a problem that the bent distance of the ribbon could not be accurately controlled as ¼ of the wave length of the incident light. Also, in case the ribbon 2 which is bent to the substrate 1 side reaches to the substrate 1 in driving the GLV, the ribbon was not recovered to the original state even if the application of the voltage is stopped and the substrate was stuck on the substrate. Therefore, the GLV could not be used.

SUMMARY OF THE INVENTION

Therefore, an object of the present invention is to provide an optical modulator and an image projection display apparatus, capable of reducing a size of a system and improving efficiency, by excluding mechanical factors and using an optical modulator in which a reflection plane is attached to a nonlinear matter.

To achieve these and other advantages and in accordance with the purpose of the present invention, as embodied and broadly described herein, there is provided an optical modulator, including a nonlinear matter which is divided into predetermined regions having a direction of a polarization which is periodically reversed, an electrode which is joined with the upper and lower sides of the nonlinear matter, for applying an electric field to the polarization region at the lower portion of the nonlinear matter and a reflection plane which is joined to the rear surface of the nonlinear matter, for reflecting an incident light to an incident region again.

To achieve these and other advantages and in accordance with the purpose of the present invention, as embodied and broadly described herein, there is provided a method for fabricating an optic modulator, including the steps of positioning a plurality of electrodes in the upper and lower portions of a nonlinear matter, forming a plurality of regions having polarization which is periodically reversed by reversing the polarization by applying a power source to the electrode, composing a plurality of pixels by grouping a plurality of polarization regions in pairs after removing all of the electrodes, controlling the state of the light which is projected in each pixel by forming a plurality of electrodes which are mutually separated, in the respective pixels and coating a material which can reflect a light to the respective plural pixels on an opposite side of the incident region.

To achieve these and other advantages and in accordance with the purpose of the present invention, as embodied and broadly described herein, there is provided an image projection display apparatus using a reflective optical modulator, including a light source 150 for irradiating a light, a breaker plane 140 which is positioned in the upper portion of the light source 150, for reflecting the light of the light source into an one-dimensional optical modulator and intercepting a light which is not diffracted in the one-dimensional optical modulator 160, a collimating lens 130 for focusing the light which is diffracted in the one-dimensional optical modulator 160, a focusing lens 120 for focusing the light of the collimating lens and a Galvano meter 100 for irradiating an image plane by reflecting the light which is irradiated through the focusing lens 120.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
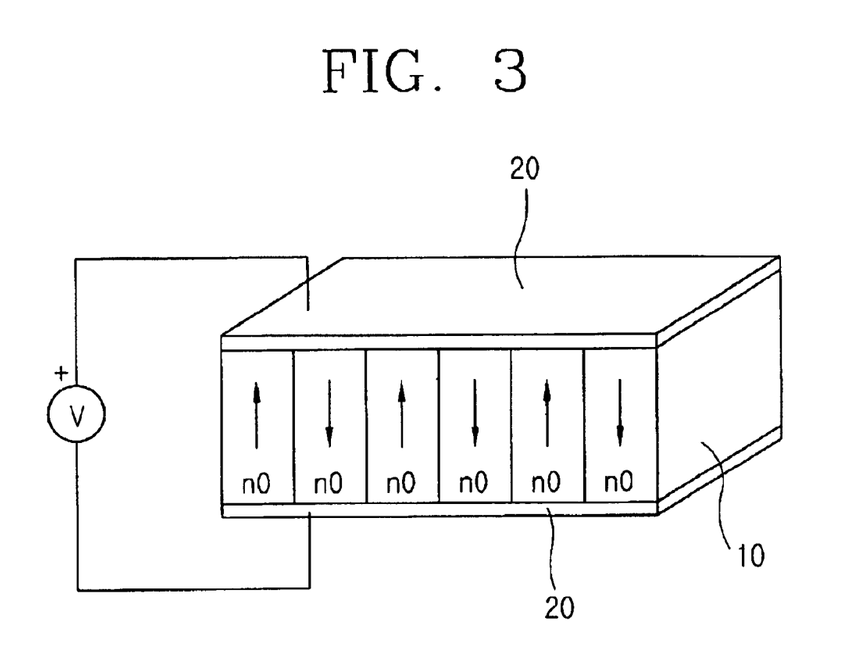
FIG. 3 is a perspective view showing a structure of an one-dimensional optical modulator in accordance with the present invention.

FIG. 3 is a perspective view showing a structure of an one-dimensional optical modulator in accordance with the present invention.

As shown in FIG. 3, the one-dimensional optical modulator in accordance with the present invention includes a nonlinear matter 10 which is divided into predetermined regions and designed to have a direction of a polarization of the separated regions, which is periodically reversed, and an electrode 20 for applying a voltage to the upper and lower sides of a polarization region of the nonlinear matter 10.

The respectively divided regions of the nonlinear matter indicate unit cells and a pixel which is a region to which a light is applied is formed by grouping the unit cells. The one-dimensional optical modulator is composed so that the respective electrodes 20 are applied to the plurality of respective pixels.

The nonlinear matter 10 is an optical material having a nonlinear characteristic and as the nonlinear matter 10, substances such as $LiNbo_3$, RTA, KTP and the like.

The operation of the one-dimensional optical modulator in accordance with the present invention will be described in detail with reference to FIGS. 4A, 4B, 5A and 5B.

Figure 4A:
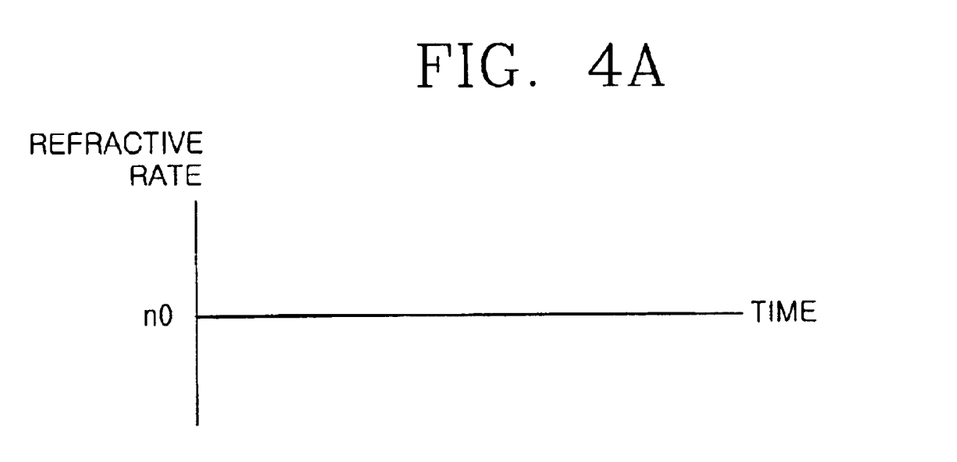
FIG. 4A is a wave form diagram illustrating a change in a refractive rate of the one-dimensional optical modulator in case a voltage is not applied in accordance with the present invention.
Figure 4B:
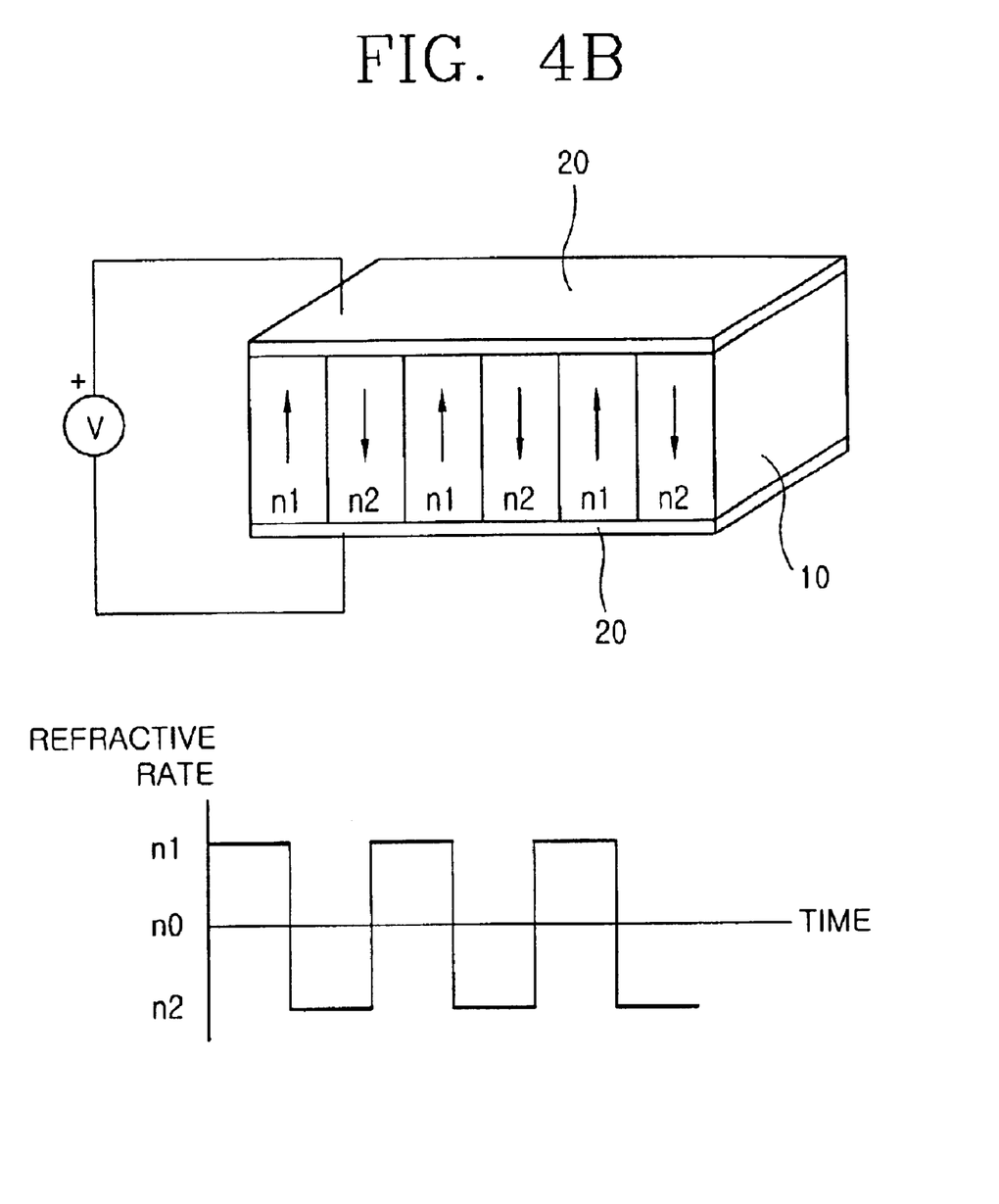
FIG. 4B is a wave form diagram illustrating a change in a refractive rate of the one-dimensional optical modulator in case a voltage is applied in accordance with the present invention.
Figure 5A:
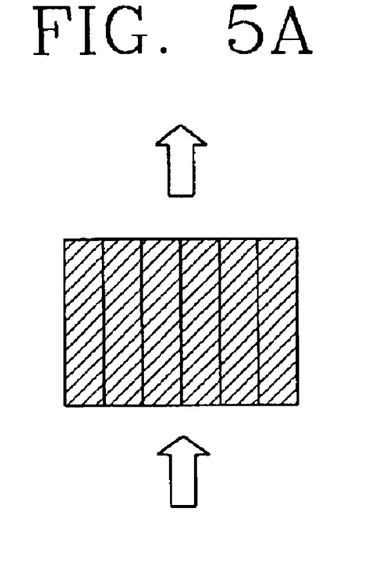
FIG. 5A is a pattern view illustrating a shape of an incident light and projective light in case the voltage is not applied in FIG. 3 in accordance with the present invention.
Figure 5B:
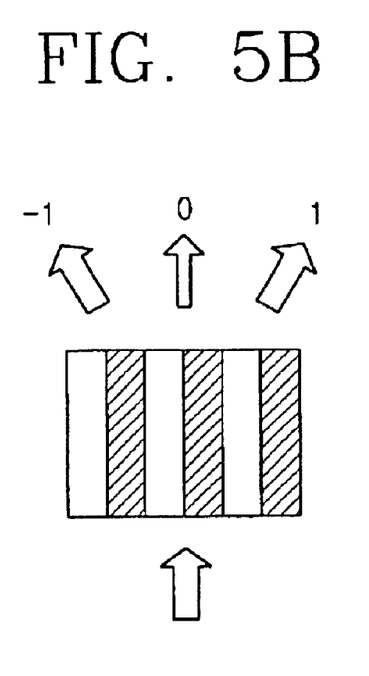
FIG. 5B is a pattern view illustrating the shape of the incident light and projective light in case the voltage is applied in FIG. 3 in accordance with the present invention.

FIG. 4A is a wave form diagram illustrating a change in a refractive rate of the one-dimensional optical modulator in case a voltage is not applied in accordance with the present invention, FIG. 4B is a wave form diagram illustrating a change in a refractive rate of the one-dimensional optical modulator in case a voltage is applied in accordance with the present invention, FIG. 5A is a pattern view illustrating a shape of an incident light and projective light in case the voltage is not applied in FIG. 3 in accordance with the present invention, and FIG. 5B is a pattern view illustrating the shape of the incident light and projective light in case the voltage is applied in FIG. 3 in accordance with the present invention.

As shown in FIGS. 4A and 5A, in case a voltage is not applied to the electrode 20 of the one-dimensional optical modulator, when a light is irradiated to the non-linear matter 10 in the parallel direction to the electrode 20, whole refractive rates of the nonlinear matter 10 are all identical, and accordingly, the irradiated light is not refracted but directly projected.

That is, in case the refractive rate n0 is 1, since there is no change in the whole refractive rate of the nonlinear matter 10 according to time T, the incident light is directly projected in the nonlinear matter 10.

Then, when a voltage is applied to the electrode 20, as shown in FIGS. 4B and 5B, the refractive rate is periodically changed according to the time T, and the incident light is diffracted in a predetermined direction and projected.

That is, when a voltage is applied to the electrode 20, among the divided regions of the nonlinear matter, a refractive rate of a side n1 is larger than the base refractive rate n0 according to the direction of polarization and another refractive rates n2 of the another polarization regions become smaller than the base refractive rate n0.

When there is a change in refractive rate of the nonlinear matter, the refractive rate of a side becomes larger than the base refractive rate n0 (n1>n0) and the refractive rate of another side becomes smaller than the base refractive rate n0 (n2<n0) according to the direction of the polarization. The incident light is modulated as a phase difference is generated in a position where the light passes the nonlinear matter and projected, thus to function as a diffracting grating.

However, since the difference of the refractive rate (n1−n2) by the polarization of the nonlinear matter 10 is limited according to the size of the nonlinear matter 10, the length of the region that the light is projected must be long to have a phase difference as much as preferred amount according to the wave length of the light. Therefore, since the length of the nonlinear matter 10 must be lengthened according to the wave length of the light, size of system became larger.

To solve such problem, a reflection plane is attached on the rear surface of the nonlinear matter 10 in accordance with the present invention. The composition of the above described one-dimensional optical modulator will be described with reference to FIG. 6.

Figure 6:
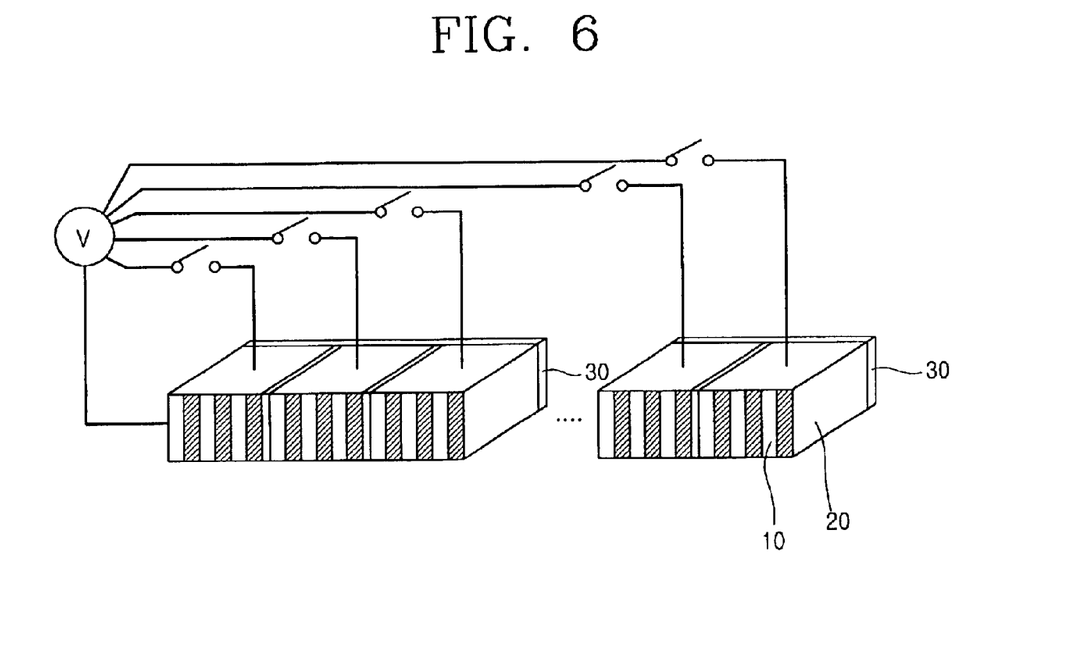
FIG. 6 is a view showing a structure of a reflective optical modulator in accordance with the present invention.

FIG. 6 is a view showing a structure of a reflective optical modulator in accordance with the present invention.

As shown in FIG. 6, the modulator of the present invention includes a nonlinear matter 10 which is formed by grouping pixels in a line, for periodically reversing the direction of the polarization of divided regions (180° difference) by dividing the modulator into predetermined regions, and forming a pixel by grouping a plurality of divided regions, an electrode 20 which contacts to the upper and lower sides of the respective pixels to be opposed, for applying an electric field and a reflection plane 30 which is contacted with the rear surface of the pixel, for reflecting an incident light to the nonlinear matter 10 again.

In the reflective one-dimensional optical modulator, a plurality of small electrodes are positioned in the upper and lower portions of the nonlinear matter 10. The separated distance among the electrodes is set identical as the size of the electrode. After positioning the electrode, and forming a plurality of regions having periodically reversed polarization by reversing the polarization by applying a power source to the electrode, the electrodes all are removed. A pixel is formed by grouping the plurality of polarization regions. At this time, the state of the light which is projected from each pixel is controlled by a plurality of electrodes which can be mutually separated at the upper and lower sides so that the pixel regions are respectively driven. The modulator is fabricated by coating a material which can reflect to respective plural pixels on an opposite side of the region where the light is made incident.

The plurality of pixels are aligned in an one-dimensional structure and each pixel is composed of 6 polarization regions.

The number of the polarization of the pixel can be adjusted by the manufacturer, but efficiency is highest in case of 6.

The operation of the one-dimensional optical modulator with the above composition will be described in detail with reference to FIG. 7.

Figure 7:
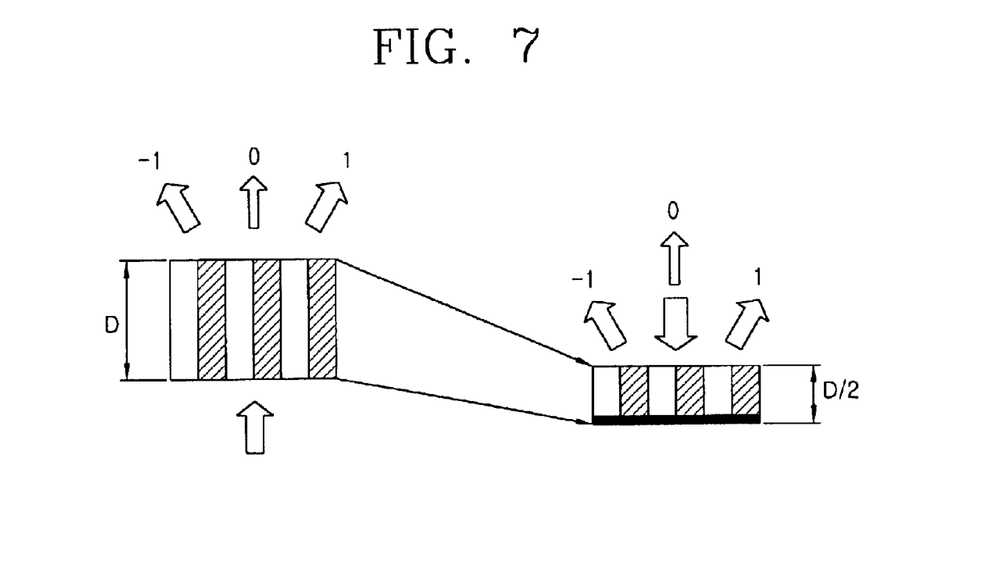
FIG. 7 is a view showing comparison of shapes of an incident light and projective light in the reflective optical modulator in accordance with the present invention and projective one-dimensional optical modulator.

FIG. 7 is a view showing comparison of shapes of an incident light and projective light in the reflective optical modulator in accordance with the present invention and projective one-dimensional optical modulator.

When a light is made incident parallel to the electrode 20 onto the front surface of the pixel having a reflection plane 30 on a surface, the incident light is reflected to the refection plane through the nonlinear matter 10, and refracted.

Therefore, in case a length of a region where the light of the projective nonlinear matter 10 having a periodically reversed polarization region is D, the length of the reflective nonlinear matter 10 having a reflection plane 30 on a surface is required as half (D/2) of the length of the projective nonlinear matter since the incident light is reflected again. Accordingly, the size of the one-dimensional optical modulator can be reduced.

That is, if a power source is not applied to the one-dimensional optical modulator, an incident light is collided into the reflection plane since the refractive rate $n0$ of the polarization of the pixel is uniform.

Then, when a power source is applied to the one-dimensional optical modulator, a refractive rate of a side $n1$ is larger than the base refractive rate $n0$ according to the direction of polarization and another refractive rates $n2$ of the another polarization regions becomes smaller than the base refractive rate $n0$.

When a light is made incident on the above pixel, a difference of refractive rate is generated according to the polarization directions, a phase difference is generated as the light passes the nonlinear matter 10, and accordingly the light is reflected having a predetermined diffraction angle.

Therefore, since the light passes as it is made incident on the nonlinear matter and passes as it is reflected, the light becomes to have a phase difference corresponding to as twice as the distance of the nonlinear matter 10.

Therefore, when a reflective nonlinear matter is used, size of the system can be reduced and efficiency is improved about twice as much as in case a projective nonlinear matter 10 is used.

The image projection apparatus using the one-dimensional optical modulator with the above composition will be described with reference to FIGS. 8A, 8B, 9A, 9B, 10A and 10B.

Figure 8A:
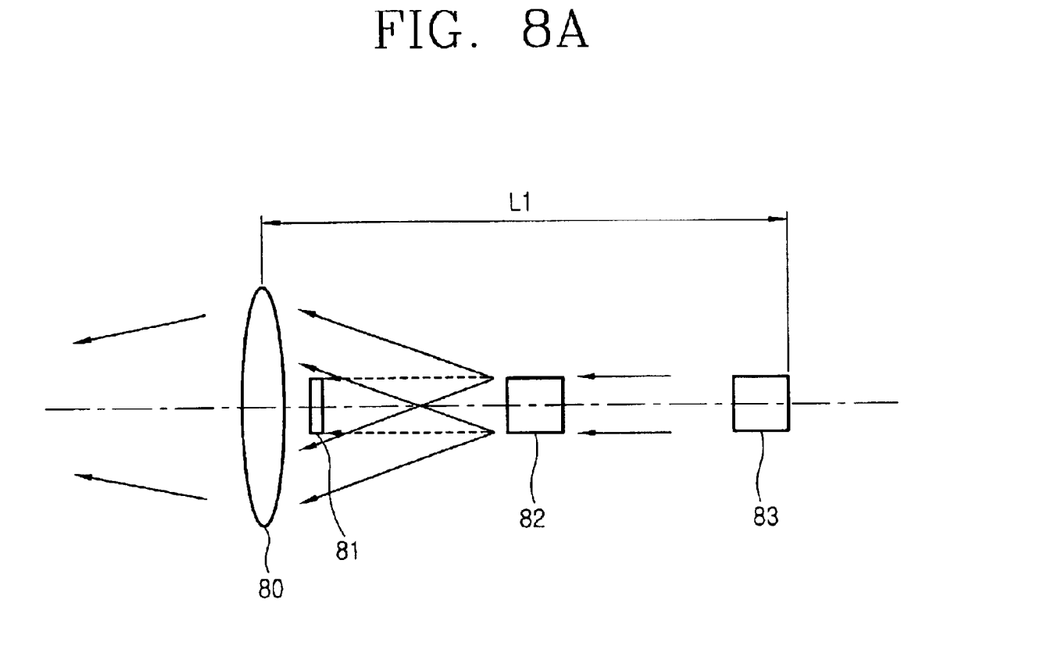
FIG. 8A is a plan view showing a projection apparatus using the one-dimensional optical modulator in accordance with the present invention.
Figure 8B:
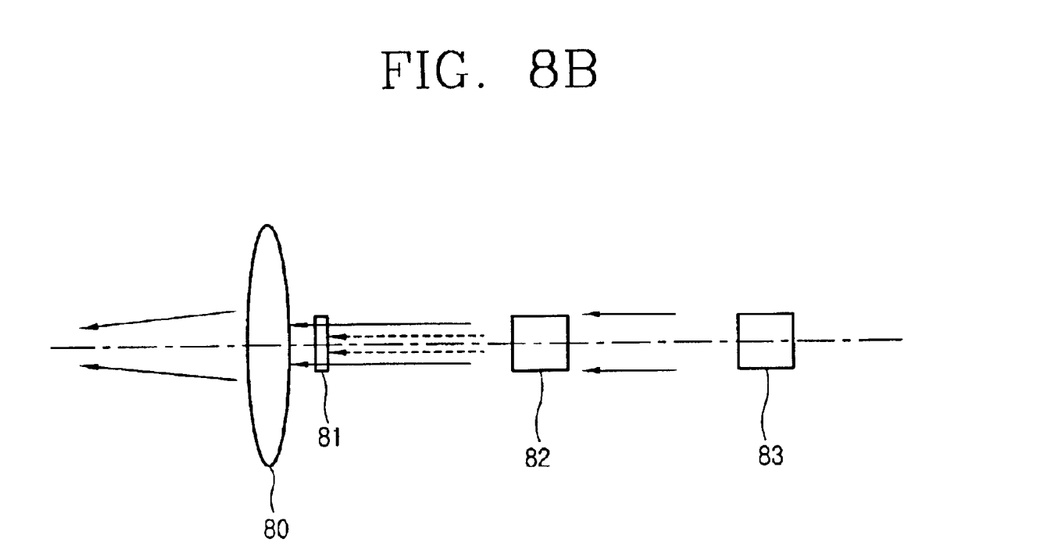
FIG. 8B is a side view showing the projection apparatus using the one-dimensional optical modulator in accordance with the present invention.

Firstly, the projection apparatus using a projective one-dimensional optical modulator will be described as follows.

FIG. 8A is a plan view showing a projection apparatus using the one-dimensional optical modulator in accordance with the present invention and FIG. 8B is a side view showing the projection apparatus using the one-dimensional optical modulator in accordance with the present invention.

As shown in the drawings, the image projection apparatus includes an one-dimensional optical modulator 82 which is a predetermined distance apart from a light source 83, for outputting a light by diffracting it to respective pixels, a breaker plane 81 for breaking the light which is directly projected without being diffracted in the one-dimensional optical modulator 82, and a collimating lens 80 for forming an image by focusing the light which is diffracted in the one-dimensional optical modulator without being broken by the breaker plane 81.

In the projection apparatus using the projective one-dimensional optical modulator, the collimating lens 80, one-dimensional optical modulator 82 and light source 83 must be positioned in a line. Therefore, if a length from the light source 83 to the collimating lens 80 is L1, the L1 is relatively lengthened according to the wave length of the light source and the thickness of the image projection apparatus becomes thicker.

Also, the size of the one-dimensional optical modulator 82 is twice as the reflective one, and the size of the projection apparatus becomes larger and thicker since projection length of the light must become longer according to the size of the one-dimensional optical modulator 82.

To solve the above problem, a reflective projection apparatus is used. The reflective projection apparatus will be described in detail with reference to FIGS. 9A, 9B, 10A and 10B.

Figure 9A:
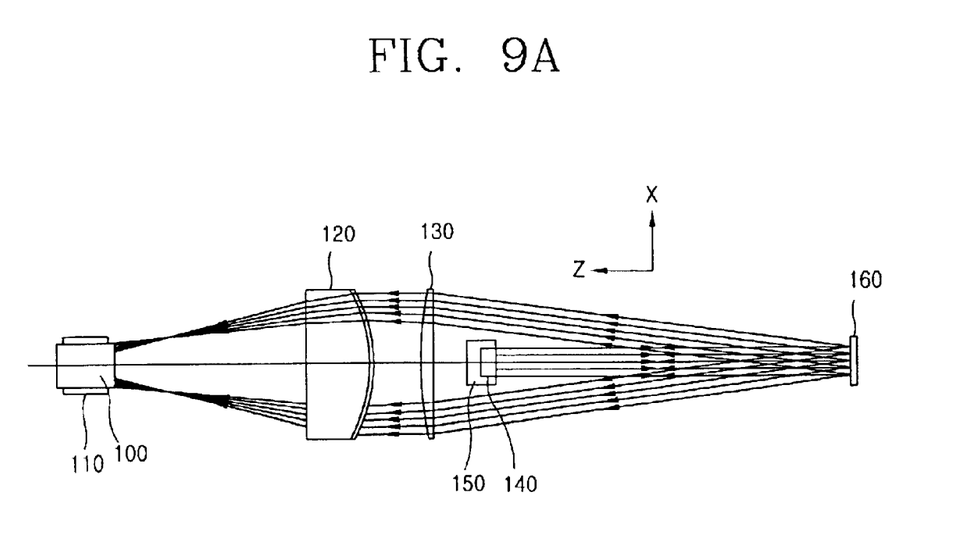
FIG. 9A is a plan view showing a structure of a display apparatus using the one-dimensional optical modulator in accordance with the present invention.
Figure 9B:
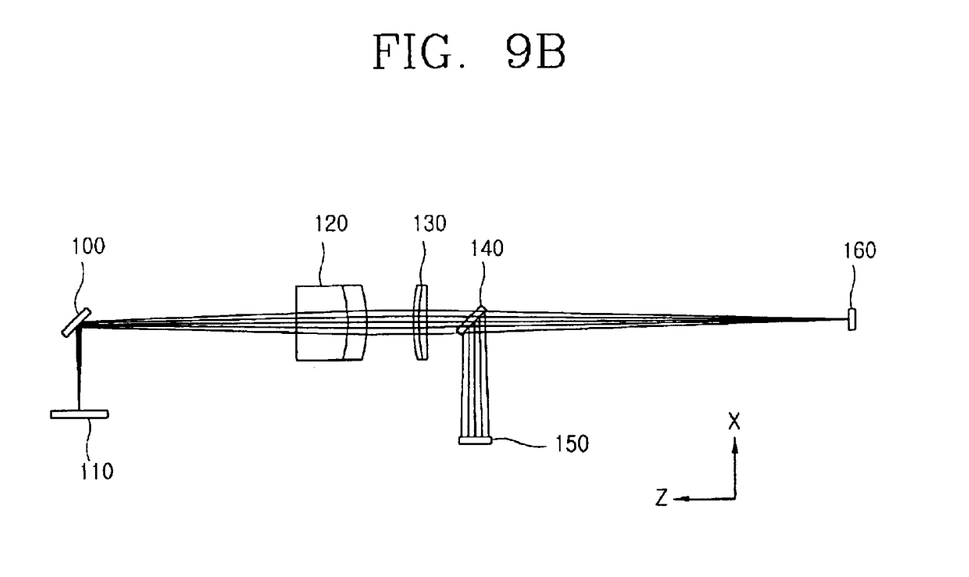
FIG. 9B is a side view showing a structure of the display apparatus using the one-dimensional optical modulator in accordance with the present invention.

FIG. 9A is a plan view showing a structure of a display apparatus using the one-dimensional optical modulator in accordance with the present invention and FIG. 9B is a side view showing a structure of the display apparatus using the one-dimensional optical modulator in accordance with the present invention.

As shown in the drawings, the display apparatus includes a light source 150, a breaker plane 140 which is positioned in the upper portion of the light source 150, for reflecting the light of the light source to an one-dimensional optical modulator 160 and intercepting the light which is not diffracted in the one-dimensional optical modulator 160, a collimating lens 130 for focusing the light which is diffracted in the one-dimensional optical modulator 160, a focusing lens 120 for focusing the light and a Galvano meter 100 for irradiating an image plane 110 by reflecting the light which is irradiated through the focusing lens 120.

The reflective projection apparatus of the display apparatus with the above composition will be described in detail with reference to FIGS. 10A and 10B.

Figure 10A:
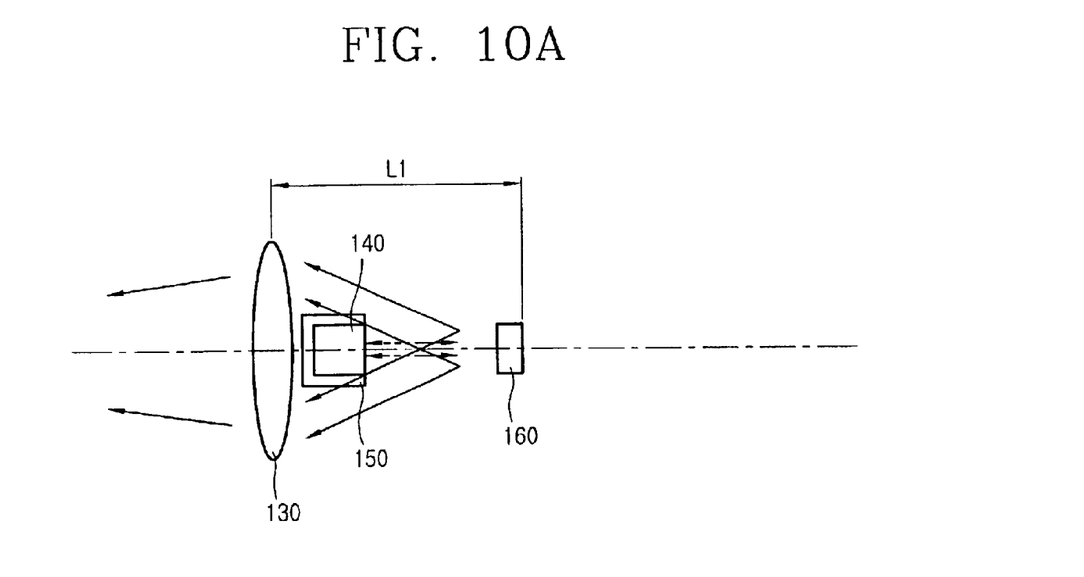
FIG. 10A is a plan view showing a projection apparatus using a reflective one-dimensional optical modulator in accordance with the present invention.
Figure 10B:
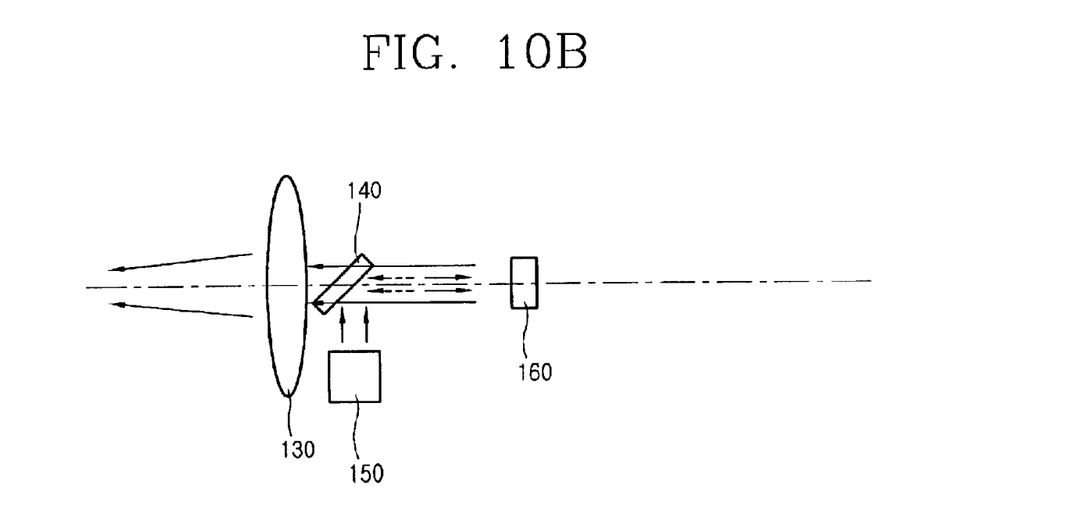
FIG. 10B is a side view showing the projection apparatus using the reflective one-dimensional optical modulator in accordance with the present invention.

FIG. 10A is a plan view showing a projection apparatus using a reflective one-dimensional optical modulator in accordance with the present invention and FIG. 10B is a side view showing the projection apparatus using the reflective one-dimensional optical modulator in accordance with the present invention.

As shown in the drawings, the projection apparatus includes a light source 150, a breaker plane 140 which is positioned in the upper portion of the light source 150, for reflecting the light of the light source to an one-dimensional optical modulator 160 and intercepting the light which is not diffracted in the one-dimensional optical modulator 160, and a collimating lens 130 for focusing the light which is diffracted in the one-dimensional optical modulator 160.

At this time, in the composition of the projection apparatus, the light source 150 is not positioned on the extension line of the one-dimensional optical modulator 92 and collimating lens 94, but is positioned parallel to the extension line of the one-dimensional optical modulator 160 and collimating lens 130, thus to reduce the thickness of the projection apparatus.

That is, in the reflective projection apparatus, a length from the light source 83 of the projective projection apparatus (shown in FIG. 8A or 8B) to the one-dimensional optical modulator 82 is reduced, and accordingly, the length L2 of the reflective projection apparatus becomes remarkably shorter than the length L1 of the projection apparatus. Also, the size of the reflective one-dimensional optical modulator 160 becomes half of the size of the projective one-dimensional optical modulator 82, thus to reduce the size of the projection apparatus.

The one-dimensional optical modulator 160 can be composed using a modulator or a three-plane type one-dimensional optical modulator having three modulators and x-cobe prism 161.

The three-plane type one-dimensional optical modulator will be described in detail with reference to FIG. 11.

Figure 11:
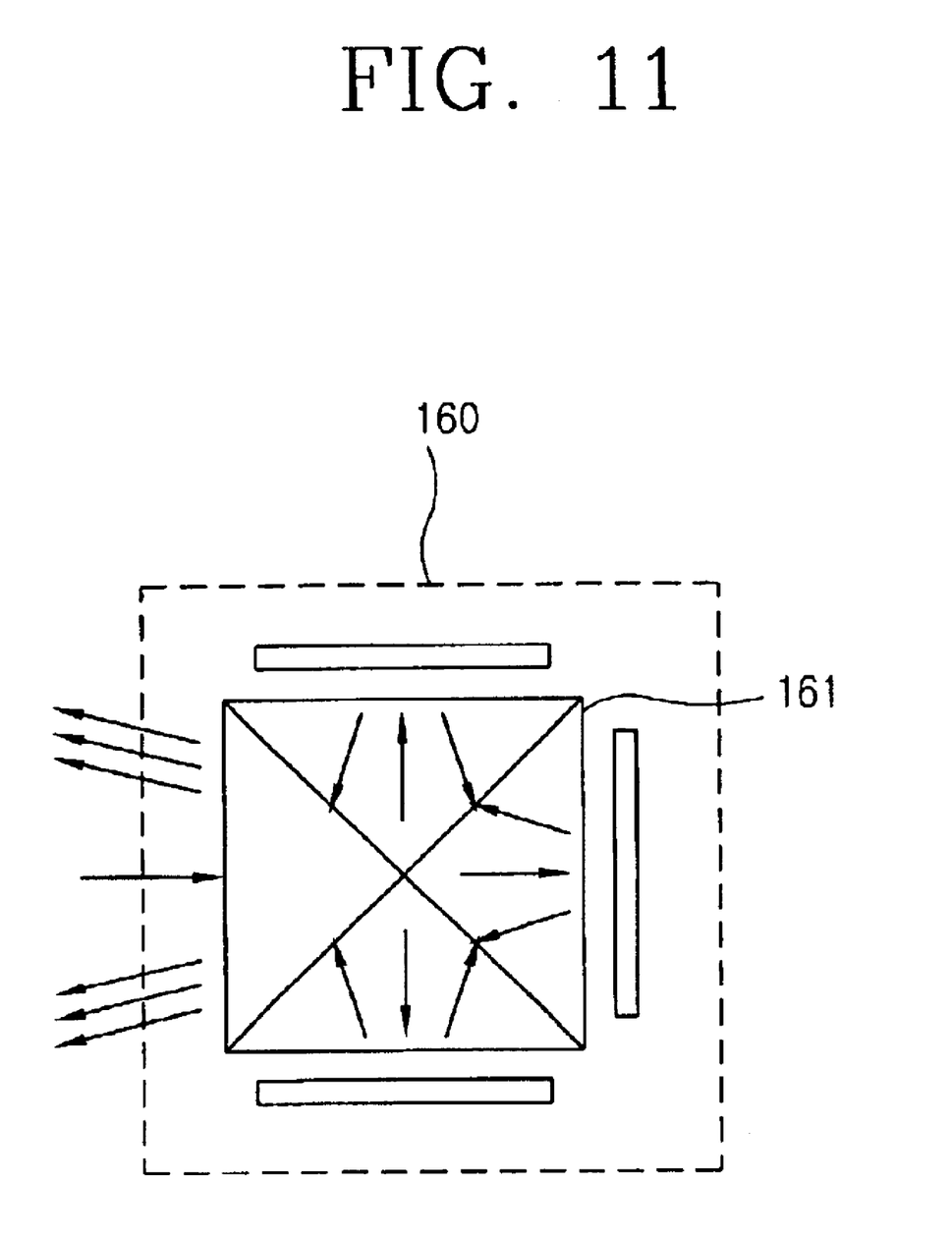
FIG. 11 is a view showing a structure of a three-plane type reflective one-dimensional optical modulator in accordance with the present invention.

FIG. 11 is a view showing a structure of a three-plane type reflective one-dimensional optical modulator in accordance with the present invention.

As shown in FIG. 11, red, green and blue lights are made incident on three optical modulators by reflecting a light of a predetermined wave length into a selective angle on the respective reflection plane of the x-cube prism, and reflected and diffracted light is displayed by being focused on the reflection plane 100 of the x-cube prism. Colors can be easily implemented by using the three-plane type reflective one-dimensional optical modulator 160.

In the above description, the one-dimensional optical modulator was described as the embodiments, but a two or three dimensional optical modulator can be also used in the embodiment.

As described above, with the present invention, the size of the one-dimensional optical modulator can be reduced and the efficiency can be improved by diffracting a projected light by generating a phase difference of the light as an electric field is applied to a nonlinear matter whose polarization direction is periodically reversed, and forming a reflection surface on the opposed surface so that the polarization direction becomes identical as the direction that the light is irradiated and projected. Also, as the size of the one-dimensional optical modulator is reduced, manufacturing cost can be reduced.

Also, reliability of the operation can be improved by excluding mechanical factors from the operation of the one-dimensional optical modulator.

Also, in case of composing a projection apparatus by using the reflective one-dimensional optical modulator, the position of the light source can be positioned parallel to the extension line between the modulator and collimating lens and accordingly, the size of the projection apparatus can be more reduced than in case the light source is positioned in an extension line between the modulator and collimating lens, thus to miniaturizing the system.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical modulator, comprising:
   a nonlinear matter which is divided into predetermined regions having a direction of polarization which is periodically reversed;
   an electrode which is joined with upper and lower sides of the nonlinear matter and installed in pixels, one by one for applying an electric field to a polarization region at a lower portion of the nonlinear matter; and
   a reflection plane joined to the rear surface of the nonlinear matter for reflecting incident light to an incident region again.

2. The modulator of claim 1, wherein a plurality of polarization regions of the divided linear matter are grouped by plural ones to form each pixel.

3. The modulator of claim 2, wherein a plurality of pixels are aligned in an array shape.

4. The modulator of claim 2, wherein the pixel is composed of 6 polarization regions.

5. The modulator of claim 1, wherein the length that the light is projected is twice as long as the length of the nonlinear matter and accordingly the length of the nonlinear matter is shortened, as the reflection plane reflects the incident light again.

6. A method for fabricating an optic modulator, comprising the steps of:
   positioning a plurality of electrodes in upper and lower portions of a nonlinear matter;
   forming a plurality of regions having polarization which is periodically reversed by applying a power source to the electrode;
   composing a plurality of pixels by grouping a plurality of polarization regions after removing all of the electrodes;

controlling the state of the light which is projected from each pixel by forming a plurality of electrodes which are mutually separated, in the respective pixels; and coating a material which can reflect light to the respective plurality of pixels on an opposite side of the incident region.

7. The modulator of claim 6, wherein the plurality of pixels are aligned in a one-dimensional structure and each pixel is composed of 6 polarization regions.

8. The modulator of claim 6, wherein the separated distance between electrodes which are installed in the upper and lower portions of the pixel is the same as the size of the electrode.

9. The modulator of claim 6, wherein the pixel has a refractive rate of polarization which is the same as the basic refractive rate, if a voltage is not applied.

10. The modulator of claim 6, wherein the pixel has a refractive rate in a direction for each polarization direction which is larger than the basic refractive rate and a refractive rate in another direction which is smaller than the basic refractive rate, if a voltage is applied.

11. The modulator of claim 6, wherein a phase difference occurs by the refraction rate difference according to the polarization direction of the incident light into the pixel and the incident light is reflected at a predetermined diffracting angle by the phase difference.

12. The modulator of claim 1 further comprising:

a light source for irradiating a light;

a breaker plane which is positioned in the upper portion of the light source for reflecting the light of the light source to an one-dimensional optical modulator and intercepting the light which is not diffracted in the one-dimensional optical modulator;

a collimating lens for focusing the light which is diffracted in the one-dimensional optical modulator;

a focusing lens for focusing the light of the collimating lens; and a Galvano meter for irradiating an image plane by reflecting the light which is irradiated through the focusing lens.

13. The apparatus of claim 12, wherein the light source is positioned in parallel with an extension line of the one-dimensional optical modulator collimating lens.

14. The apparatus of claim 12, wherein the one-dimensional optical modulator is composed of three modulators and a x-cobe prism.

15. The apparatus of claim 14, wherein the one-dimensional optical modulator includes:

a reflection portion for projecting light to a breaker plane and for reflecting light which is irradiated through the breaker plane to three surfaces according to the wave length; and three optical modulators for reflecting, diffracting and projecting the light of the reflection portion according to the application of a voltage.

* * * * *